F. E. WATTS.
UNIVERSAL JOINT ASSEMBLY.
APPLICATION FILED MAY 4, 1918.
1,273,963.
Patented July 30, 1918.
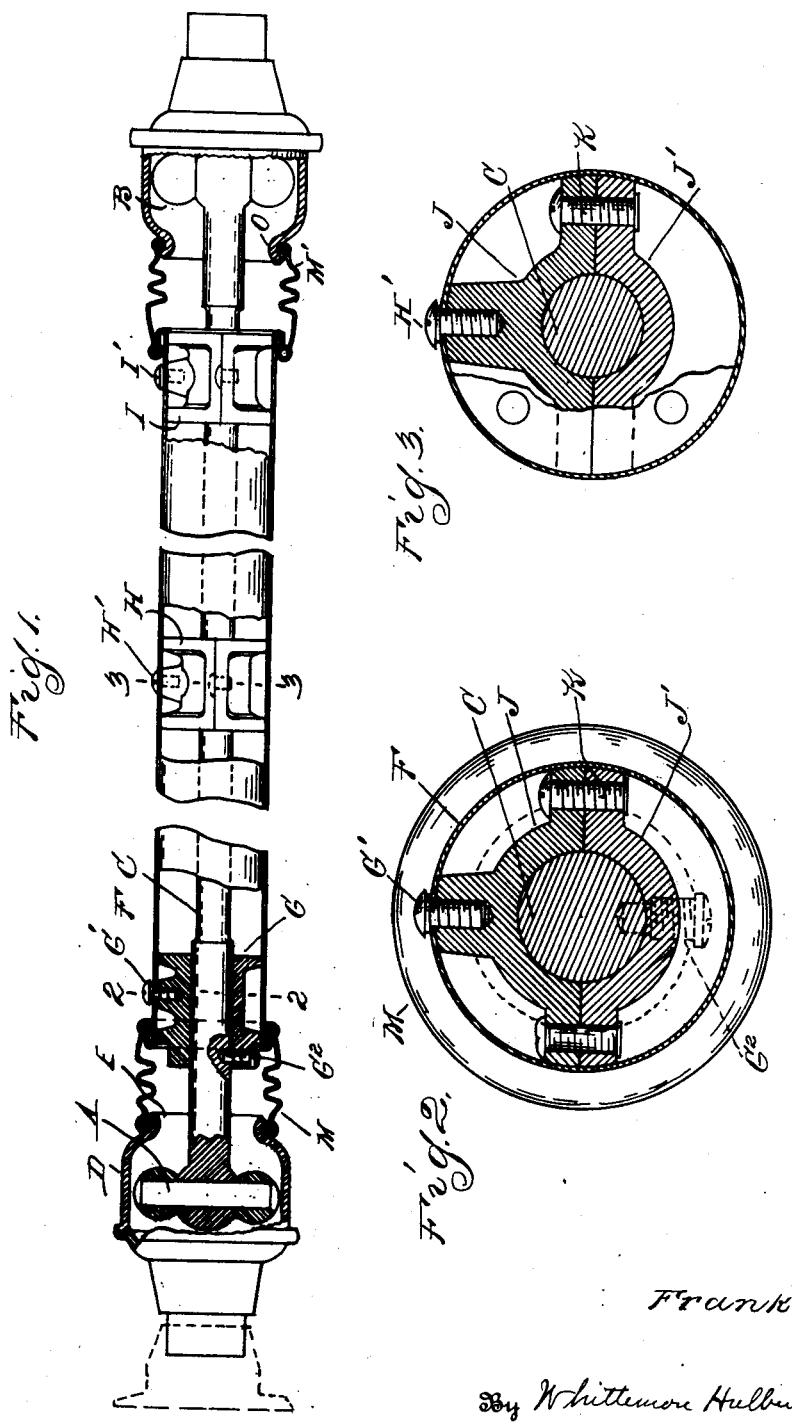
Inventor
Frank E. Watts
By Whittemore Hulbert & Whittemore
Attorneys

UNITED STATES PATENT OFFICE.

FRANK E. WATTS, OF DETROIT, MICHIGAN, ASSIGNOR TO HUPP MOTOR CAR CORPORATION, OF RICHMOND, VIRGINIA, A CORPORATION OF VIRGINIA.

UNIVERSAL-JOINT ASSEMBLY.

1,273,963.  Specification of Letters Patent.  Patented July 30, 1918.

Application filed May 4, 1918. Serial No. 232,466.

*To all whom it may concern:*

Be it known that I, FRANK E. WATTS, a citizen of the United States of America, residing at Detroit, in the county of Wayne and State of Michigan, have invented certain new and useful Improvements in Universal-Joint Assemblies, of which the following is a specification, reference being had therein to the accompanying drawings.

This invention relates to a new and improved universal joint assembly and refers more particularly to a propeller shaft construction for use in universal joint assemblies or the like.

Among the objects of the invention are to provide a shaft construction which will not bend out of line but which at the same time is sufficiently flexible to torsion so that it will be free to twist and cushion the torsional strains; to provide a construction having a stiff tube which will hold the assembly so that it will run perfectly steady; while the shaft proper is formed of a small diameter member preferably made of very strong high grade steel; to provide a shaft construction having a large diameter but light weight; and in general to provide an improved propeller shaft and universal joint assembly of the character above mentioned.

The invention also resides in the novel arrangement of the spacer members and in such other features of construction and arrangements and combinations of parts as will more fully hereinafter appear.

In the drawings:

Figure 1 is a longitudinal view, partly in section, through a universal joint assembly embodying my invention;

Fig. 2 is a cross-section, partly in elevation, on the line 2—2 of Fig. 1;

Fig. 3 is a view similar to Fig. 2 taken on line 3—3 of Fig. 1.

Describing first the general assembly shown in Fig. 1, A and B designate universal joints which are connected to the opposite ends of a shaft C. Each of the joints is preferably located within a suitable casing D which has openings E of sufficient size to permit a considerable movement of the shaft around the universal joint as a pivot. The shaft C is preferably constructed of two parts, the shaft proper comprising a member of strong high grade steel, this shaft being of relatively small diameter. Surrounding the shaft proper but spaced therefrom is a stiffening tube F which serves to hold the shaft so that it will run perfectly steady and will not bend out of line.

It is also essential that the propeller shaft of the universal joint assembly shall be arranged to take care of torsional strains and for this purpose I have provided a novel arrangement of parts whereby the stiffening tube F can be employed without interfering with the shaft proper cushioning the torsional strains. The connection between the tube F and shaft C comprises a plurality of spacer members G, H and I, the former of which is connected by a set-screw G' to the stiffening tube F and is also securely fastened to the shaft C by means of a screw $G^2$. The center and end spacers H and I are however connected only to the outer case or stiffening tube F, the spacer H being secured to the tube by a set-screw H' and the spacer I by a set-screw I'. The shaft A however is free to rotate or turn within the spacers H and I. As shown in Figs. 2 and 3, for convenience in assembly the spacers are formed in halves J and J' secured together by a screw or other suitable locking member K.

In order to exclude dust from the entire assembly there is preferably provided the flexible dust guards M and M' which extend over the ends of the stiffening tube and over flanges O on the ends of the casings D.

By the above described novel arrangement of parts a propeller shaft of large diameter and relatively light weight is obtained, while at the same time the necessary cushioning of the torisional strains is provided since the entire shaft C beyond the spacer member G is free to twist independent of the stiffening tube. I do not, however, desire to limit the invention to the particular arrangement of spacer members shown nor to use with any particular universal joint, as various changes in the details of construction and arrangements and combinations of parts can be made within the scope of my invention.

What I claim as my invention is:—

1. In a universal joint assembly, the combination with universal joints, of a propeller shaft therefor comprising a shaft proper formed of small diameter, and a stiffening tube surrounding said shaft and having spacer members interposed between said tube and shaft.

2. In a universal joint assembly, the combination with universal joints, of a propeller shaft therefor comprising a shaft proper formed of small diameter, and a stiffening tube surrounding said shaft and having spacer members interposed between said tube and shaft, one of said spacer members being secured to said tube and said shaft.

3. In a universal joint assembly, the combination with universal joints, of a propeller shaft therefor comprising a shaft proper formed of small diameter, and a stiffening tube surrounding said shaft and having spacer members interposed between said tube and shaft, one of said spacer members being secured to said tube and said shaft and another of said spacer members being secured to said tube but independently rotatable on said shaft.

4. A propeller shaft for universal joint assemblies or the like, comprising a centrally arranged shaft of relatively small diameter, a stiffening tube surrounding said shaft, a plurality of spacer members interposed between said shaft and tube and arranged to hold said shaft from bending while permitting the shaft to twist sufficiently to cushion torsional strains.

5. A propeller shaft, comprising a shaft member of small diameter formed of high grade steel, a plurality of spacer members distributed throughout different longitudinal portions of the shaft, and a stiffening tube fitting over and secured to said spacer members.

6. A propeller shaft, comprising a shaft member of small diameter formed of high grade steel, a plurality of spacer members distributed throughout different longitudinal portions of the shaft, and a stiffening tube fitting over and secured to said spacer members, the spacer member at one end being secured to said shaft and the other spacer members being free to turn upon the shaft.

In testimony whereof I affix my signature.

FRANK E. WATTS.